April 14, 1964     B. W. BROWNING     3,128,570
SAFETY AND DRY-FIRING DEVICE FOR PISTOLS
Filed Sept. 19, 1961     5 Sheets-Sheet 1

INVENTOR.
BRUCE W. BROWNING

BY Lindsey, Pritzman and Hayes
ATTORNEYS

April 14, 1964 B. W. BROWNING 3,128,570
SAFETY AND DRY-FIRING DEVICE FOR PISTOLS
Filed Sept. 19, 1961 5 Sheets-Sheet 2

INVENTOR.
BRUCE W. BROWNING

April 14, 1964   B. W. BROWNING   3,128,570
SAFETY AND DRY-FIRING DEVICE FOR PISTOLS
Filed Sept. 19, 1961   5 Sheets-Sheet 3
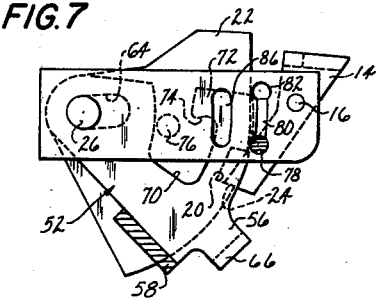
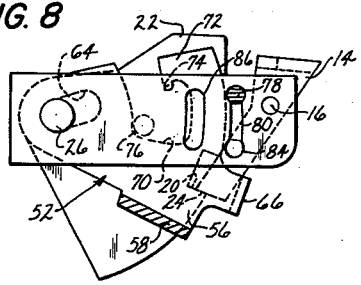
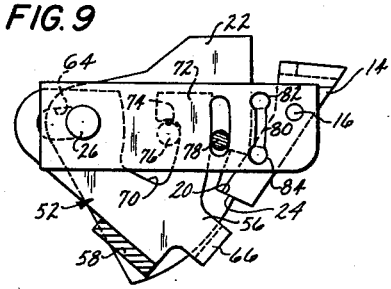
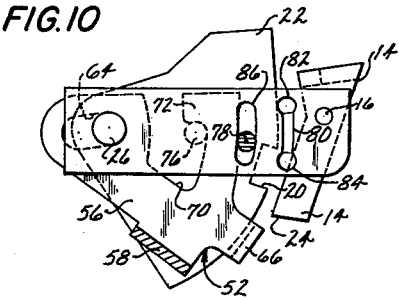
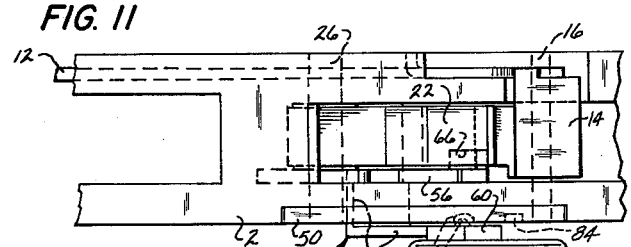
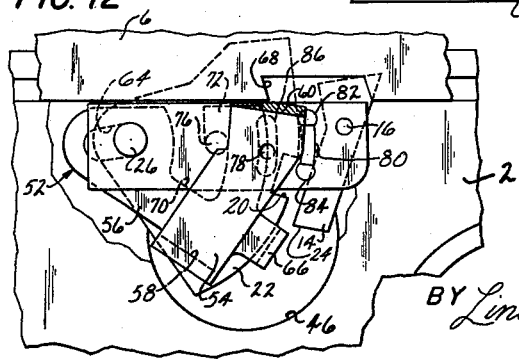
INVENTOR.
BRUCE W. BROWNING
BY Lindsey, Prutzman and Hayes
ATTORNEYS

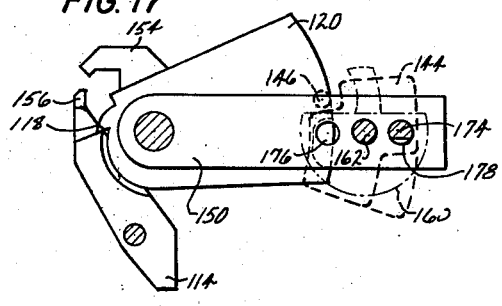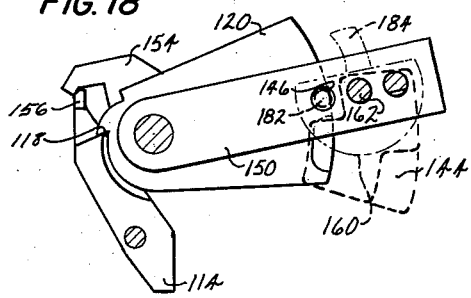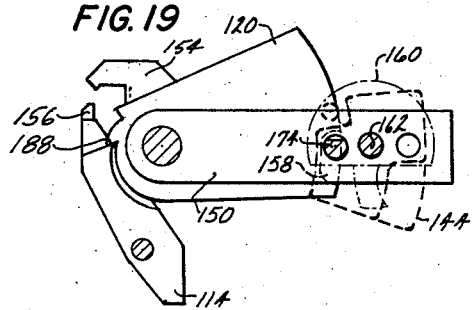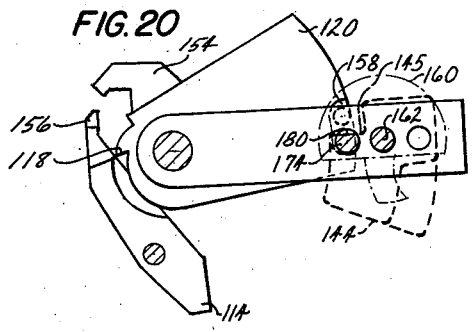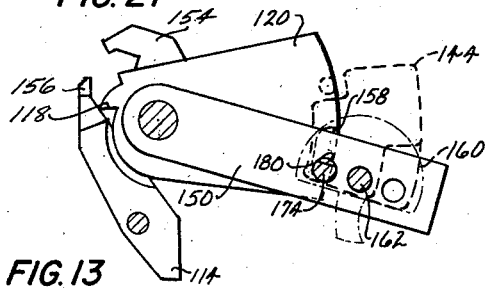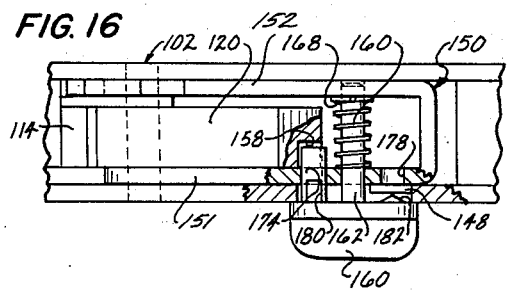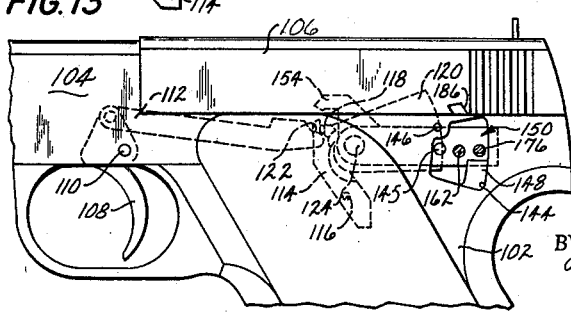

April 14, 1964   B. W. BROWNING   3,128,570
SAFETY AND DRY-FIRING DEVICE FOR PISTOLS
Filed Sept. 19, 1961   5 Sheets-Sheet 5
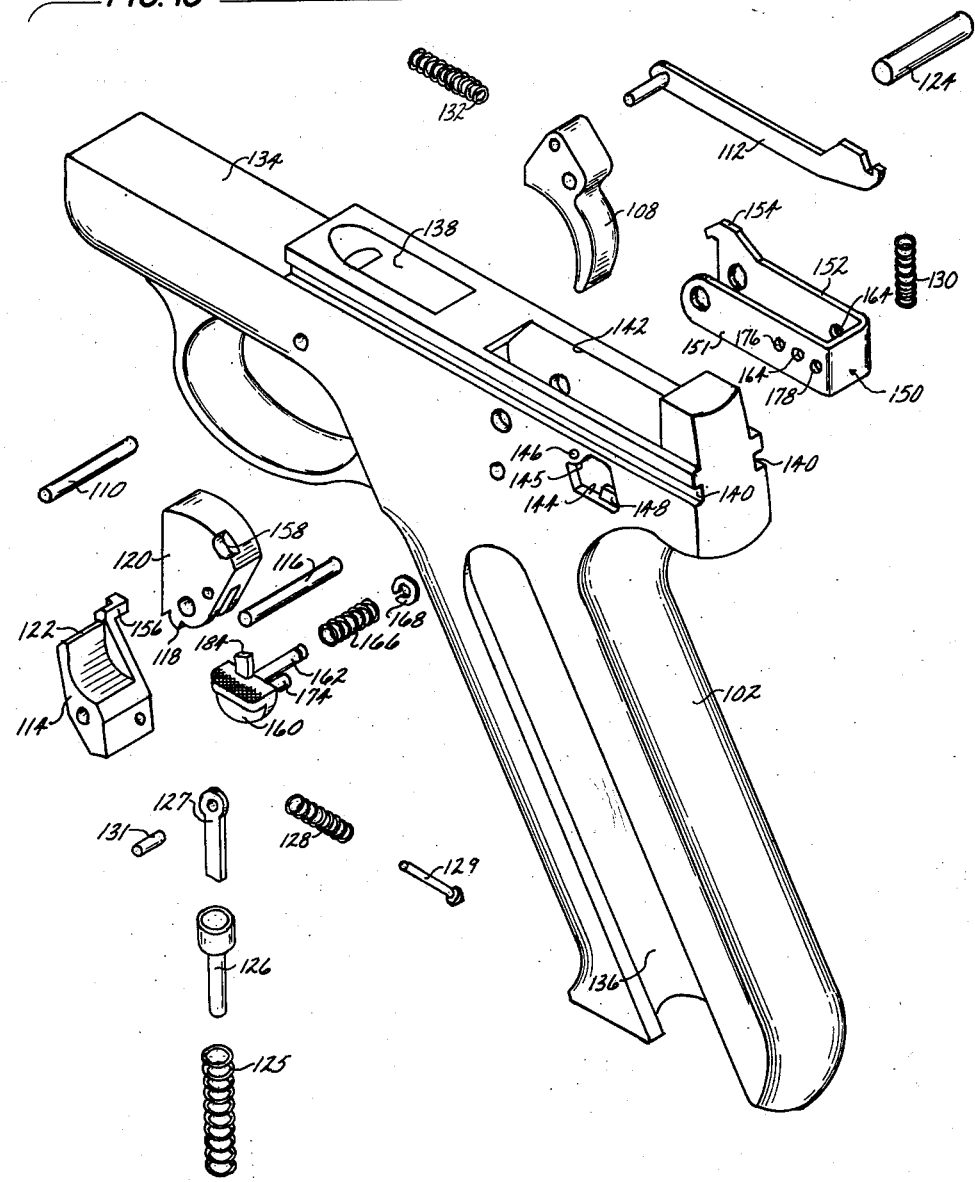
FIG. 15
FIG. 14
INVENTOR
BRUCE W. BROWNING
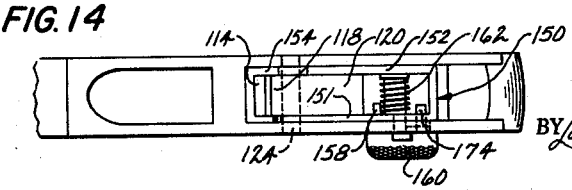
ATTORNEYS United States Patent Office 3,128,570
Patented Apr. 14, 1964

3,128,570
SAFETY AND DRY-FIRING DEVICE FOR PISTOLS
Bruce W. Browning, Ogden, Utah, assignor to Browning Industries, Inc., Ogden, Utah, a corporation of Utah
Filed Sept. 19, 1961, Ser. No. 139,276
16 Claims. (Cl. 42—70)

The present invention relates to pistols and particularly pistols of the semi-automatic type. The invention is concerned more specifically with a dry-firing device which can be provided in combination with a safety for such weapons.

An object of the invention is to provide a device for use in a pistol to permit the pistol to be dry fired by which is meant that the trigger of the pistol can be pulled to release the hammer, but the hammer will not strike the firing pin. Included in this object is the provision of means whereby an unexposed hammer may be easily re-cocked after dry firing.

Another object is to provide such a dry-firing device in combination with a safety of the positive sear block type and to provide means whereby the device may be conveniently and quickly conditioned for the type of operation desired.

A more specific object is to provide a device of the character referred to which can be operated by a conveniently located thumb piece and wherein the setting of the device may be readily ascertained at all times.

A further object is to provide such a device which is of simple and effective construction so that it may be fabricated and assembled at moderate cost and will be durable and reliable in operation.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

In the drawings:

FIG. 7 is a schematic side view of the sear and hammer with the safety and dry firing member set for normal firing of the pistol;

FIG. 8 is a similar schematic side view with the safety member set in the safety position;

FIG. 9 is a similar schematic side view with the safety member set in the dry firing position and before the trigger has been pulled;

FIG. 10 is a view similar to FIG. 8 after the trigger has been pulled in dry firing;

FIG. 11 is an enlarged fragmentary top view similar to FIG. 3 wherein the safety and dry firing member is in dry-firing position;

FIG. 12 is a fragmentary side view of the rear portion of the pistol after the trigger has been pulled in dry-firing and having portions of the frame and safety member broken away;

FIG. 13 is a fragmentary side view of the rear portion of a pistol provided with another embodiment of a dry-firing and safety mechanism and having the thumb piece removed and showing certain of the operating parts in phantom;

FIG. 14 is a fragmentary top view of the pistol of FIG. 13 with the slide and barrel assembly removed and showing the safety and dry-firing mechanism as disposed for normal firing;

FIG. 15 is an exploded perspective view to an enlarged scale of the mechanism shown in FIG. 14;

FIG. 16 is an enlarged fragmentary top view in partial section of a portion of the mechanism shown in FIG. 14 with the safety and dry-firing assembly disposed for dry firing;

FIG. 17 is a schematic side view of the sear and hammer with the safety and dry-firing device of FIG. 13 set for normal firing of the pistol;

FIG. 18 is a similar schematic side view with the parts on "safe";

FIG. 19 is a similar schematic side view with the parts set for dry firing before the trigger has been pulled;

FIG. 20 is a view similar to FIG. 19 after the trigger has been pulled in dry firing; and FIG. 21 is a similar schematic side view during re-cocking of the hammer.

Figure 5:
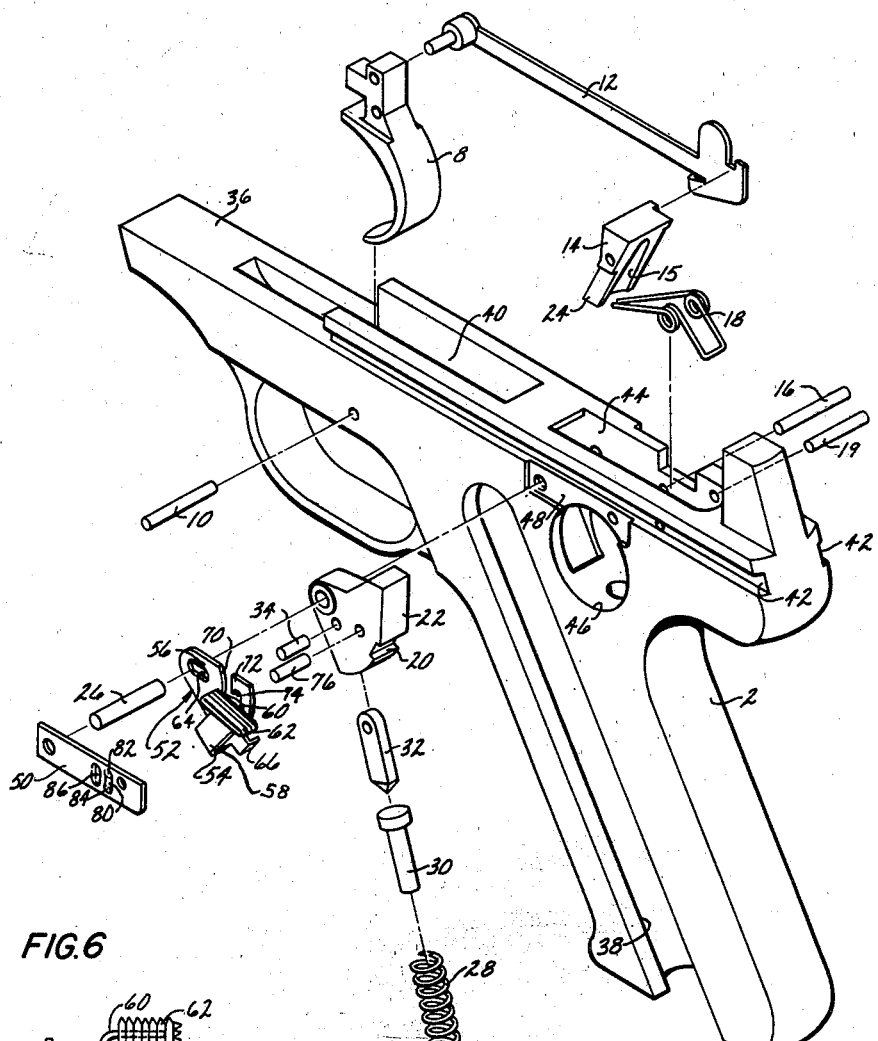
FIG. 5 is an exploded perspective view to an enlarged scale of the mechanism shown in FIG. 3.

Referring first to the embodiment of the present invention illustrated in FIGS. 1-11, and more particularly to the general assembly views provided in FIGS. 1-4, and the exploded view of the parts in FIG. 5, the automatic pistol embodying the invention is generally comprised of a frame 2, barrel 4 and operating slide 6. The pistol utilizes the well-known firing operation wherein pivoting the trigger 8 rearwardly about its pivot pin 10 moves the disconnector 12 forwardly and pivots the sear 14 forwardly about its pivot pin 16 against the biasing pressure of the sear spring 18 which is mounted on the sear pin 19 and has one end seated in a recess 15 in the rear of the sear 14 and its other end bearing against the frame. As the sear 14 pivots, the ledge 20 on the hammer 22, which in the cocked position bears against the lip 24 of the sear 14, is released and the hammer 22 falls forward, pivoting about the hammer pin 26 until it strikes the firing pin (not shown) in response to biasing pressure from the main spring assembly which is shown in FIG. 5 as comprised of the main spring 28, main spring guide 30, hammer strut 32 and strut pin 34.

As best shown in FIG. 5, the frame 2 has a platform 36 for mounting the detachable barrel 4, a clip-receiving slot 38 in the hand grip portion and a cartridge feed aperture 40 as well as longitudinal grooves 42 in its side walls for the operating slide 6. Illustration of various other conventional elements such as the extractor, firing pin, slide stop open lever and disconnector spring, has been omitted to simplify presentation since they are not essential to comprehension of the present invention.

The sear 14 and hammer 22 are pivotally mounted in the well 44 of the frame 2 and a circular cut-out 46 is formed in one side of the frame adjacent the rear of the hammer 22. The side of the frame 2 is also provided with a generally rectangular recess 48 extending longitudinally thereof across the upper portion of the cut-out 46 and in which is seated the rectangular plate 50 for a purpose to be described fully hereinafter.

Figure 6:
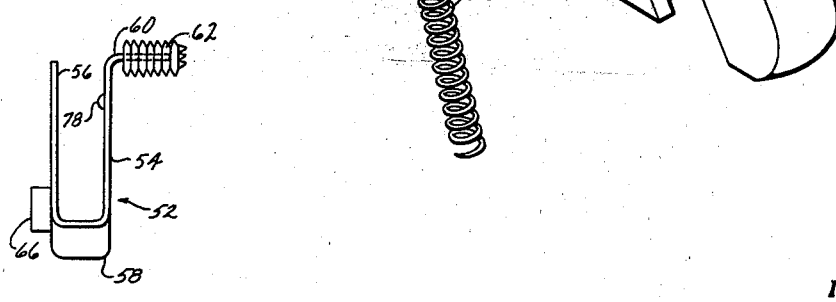
FIG. 6 is a front elevational view of the safety and dry-firing member.

Mounted in the cut-out 46 is the combination dry-firing and safety member generally designated by the numeral 52 and which is comprised of a pair of arms 54, 56 extending upwardly along the opposite surfaces of the side of the frame and a base portion 58 which extends through the cut-out 46. As best shown in FIG. 6, the upper end of the outer arm 54 is provided with an outwardly extending flange or finger 60 on which is fixed an operating thumbpiece 62 conveniently of molded plastic or the like. The inner arm 56 extends longitudinally forwardly within the well 44 and is provided with an elongated aperture 64 in the forward end thereof through which the hammer pivot pin 26 extends to pivotally mount the safety member 52 upon the frame while also permitting limited movement of the safety member longitudinally of the hammer 22. On the rear end of the inner arm 56 is an L-shaped extension or safety hook 66 which is normally disposed rearwardly of the hammer 22 and below the sear 14. The elongated aperture 64 permits movement of the safety member 52 upwardly and rearwardly to move the safety hook 66 into engagement with the rear surface of the sear 14 and lock the sear lip 24 in engagement within the ledge 20 of the hammer 22 and thereby prevent firing. During this movement, the upper end of the outer arm 54 moves into the safety notch 68 in the slide 6 to lock the slide, thus simultaneously providing both a sear lock safety and a slide lock safety mechanism.

Opening on the upper edge of the inner arm 56 is a generally L-shaped slot or cut-out 70 defining a dry-firing hook or stop 72 at the upper end of the arm rearwardly of the slot opening in the upper edge which has a recessed portion 74 in its bottom edge. A dry-firing pin 76 is mounted on the hammer 22 and extends transversely of the frame 2 into the slot 70 of the safety member 52. During movement of the safety member 52 relative to the hammer into the various positions, the pin 76 moves freely within the slot 70 and, in the forward position of lever 52, is engageable within the recessed portion 74 in the dry-firing hook 72.

An inwardly extending spherical projection 78 on the outer arm 54 of the safety member 52 is biased against the plate 50 by the spring action of the outer arm 54 which is bent slightly inwardly. In the rearward position of the safety member 52, as shown in FIGS. 7 and 8, the projection rides in a groove 80 in the plate 50 during movement of the safety member vertically of the frame. At the upper and lower ends of the groove 80 are detents 82, 84 into which the projection 78 will snap by reason of the biasing action of the outer arm 54 and thus produce a clicking sound identifying movement into the safe and fire positions. Due to the engagement of the projection 78 in the detents, the safety member will be held in position in the safety or firing positions, and the engagement of the projection within the groove 80 prevents inadvertent movement of the safety member forwardly into the dry-firing position. In the forward position of the member 52, as shown in FIGS. 9 and 10, the projection 78 is freely received within the forward groove 86 of the plate 50 so as to reduce resistance to relative movement therebetween.

Referring now to the functioning of the assembly, the schematic views in FIGS. 7–10 in conjunction with the other views illustrate the parts as disposed in the several operative positions.

In FIGS. 2–4 and 7, the safety member 52 is set for normal firing in its rearward and downward position permitted by the elongated aperture 64 which provides the pivotal connection with the hammer pin 26. In this position, the projection 78 on the safety member outer arm 54 is received in the lower detent 84 in the plate 50. Upon pulling of the trigger 8, sear 14 is rotated counterclockwise to disengage sear lip 24 from hammer ledge 20 and the hammer 22 will rotate counterclockwise and the dry-firing pin 76 is free to move outwardly through the open forward portion of the slot 70 in the safety member inner arm 56.

Figure 1:
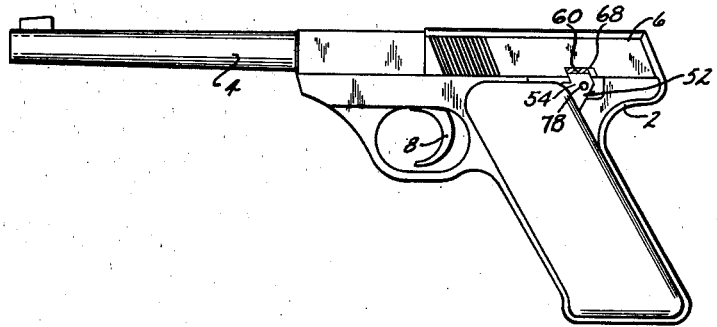
FIG. 1 is a side view partly broken away of a semi-automatic pistol provided with a preferred embodiment of a dry-firing and safety mechanism in accordance with the present invention and having the safety and dry-firing member in the safety position.
Figure 2:
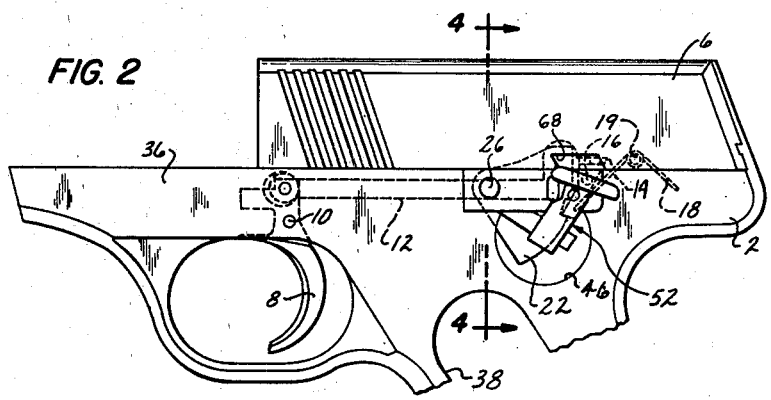
FIG. 2 is an enlarged fragmentary side view of the rear portion of the pistol with the safety member in the normal firing position and having the barrel and grip removed and certain of the operating parts in phantom.
Figure 3:
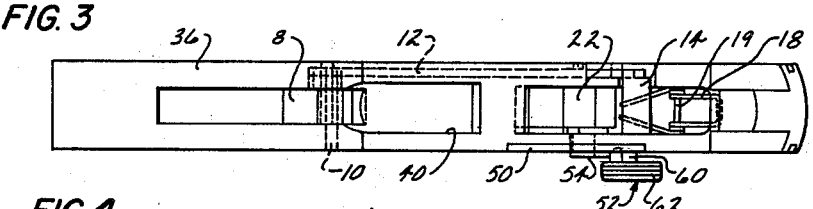
FIG. 3 is a top view of the pistol in FIG. 2 with the slide assembly removed.
Figure 4:
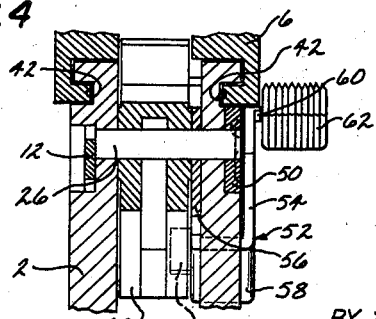
FIG. 4 is a fragmentary section along the line 4—4 of FIG. 2.

In FIGS. 1 and 8, the safety member 52 is set on safety by movement of the member into its rearward and upward position. As shown in FIG. 1, the flange 60 on the upper end of the outer arm 54 extends into the safety notch 68 in the slide 6. As shown in FIG. 8, the L-shaped safety hook 66 on the inner arm 56 simultaneously engages behind the sear 14 to lock it into engagement with the hammer 22. During movement into the safety position from the firing position, the projection 78 clicks into the upper detent 82 in the plate 50.

In FIGS. 9–12, the safety member 52 is illustrated in the dry-firing position provided by moving the member into its forward position. In FIG. 9, the cocked position is shown wherein the dry-firing pin 76 is engaged in the recessed portion 74 of the dry-firing hook 72 of the inner arm 56. Upon pulling of the trigger 8, the sear lip 24 disengages from the hammer ledge 20 as shown in FIG. 10 and the hammer 22 and safety member 52 pivot together about the hammer pivot pin 26 until the upper end of the safety member outer arm 54 (and specifically its flange 60) strikes the bottom edge of the slide 6 as shown in FIG. 12, thus preventing further movement thereof. During this movement, the click projection 78 on the safety member outer arm 54 rides freely in the forward groove 86 of the plate 50.

In the fired position illustrated in FIGS. 10 and 12, the pressure of the main spring assembly on the hammer 22 maintains the dry-firing pin 76 within the recessed portion 74 of the dry-firing hook 72, thereby preventing accidental disengagement while the hammer is in the released position. To recock the hammer 22, the thumbpiece 62 is grasped and the safety member 52 pulled downwardly which simultaneously pivots the hammer until the sear lip 24 again engages in the ledge 20 thereof, thus returning the parts to the position illustrated in FIG. 9.

Referring now to the embodiment of the invention illustrated in FIGS. 13–21, and more particularly to the general assembly views provided in FIGS. 13 and 14, and the exploded view of the parts in FIG. 15, the automatic pistol of this embodiment is generally comprised of a frame 102, barrel 104 and operating slide 106. This particular weapon utilizes the well-known firing operation wherein pivoting the trigger 108 rearwardly about its pivot pin 110 moves the disconnector 112 forwardly and pivots the sear 114 forwardly about its pivot pin 116. As the sear 114 pivots, the ledge 118 on the hammer 120, which in the cocked position bears against the lip 122 of the sear 114, is released and the hammer 120 falls forward, pivoting about the hammer pin 124 in response to biasing pressure from the main spring assembly (shown in FIG. 15) until it strikes the firing pin (not shown).

Also illustrated in FIG. 15 are other conventional elements of the pistol including the sear spring assembly comprised of the sear spring 128 and spring guide 129 which biases the sear 114 into the hammer-engaging position, the disconnector spring 130 which biases the disconnector into engagement with the sear 114, and the trigger spring 132 which returns the trigger 108 to the forward position. The main spring assembly is comprised of main spring 125, spring guide 126, hammer strut 127 and strut pin 131. The frame has a platform 134 for mounting the detachable barrel 104, a clip-receiving slot 136 in the hand-grip and a cartridge feed aperture 138, as well as the longitudinal grooves 140 for the operating slide 106. For simplicity of presentation, other conventional elements, such as the extractor, firing pin and slide stop-open lever, are not illustrated, since they are not essential to the comprehension of the present invention.

The sear 114 and hammer 120 are pivotally mounted in the well 142 of the frame and an irregularly shaped cut-out 144 is formed in one side of the frame 102 adjacent the rear edge of the hammer 120. The side of the frame 102 adjacent one corner of the cut-out 144 is provided with a depression 146 and a recess 148 is milled out at the opposite corner, both for a purpose to be described hereinafter.

A U-shaped yoke 150 is disposed within the well 142 with its arms 151, 152 extending forwardly along the sides of the hammer 120, and is pivotally mounted on the frame by the hammer pivot pin 124 which extends through the forward apertures of the arms 151, 152. On the forward portion of arm 152 is a hook-shaped projection 154 which, when the yoke 150 is pivoted forwardly latches with a projection 156 on the sear to place a block in front of the sear, as illustrated in FIG. 18, thus providing a positive safety to prevent firing of the pistol.

A thumb piece or button 160, of somewhat greater dimensions than the cut-out 144, is connected to the yoke 150 by the central mounting pin 162 which extends through the cut-out 144 and into the aligned bearing holes 164 in the arms of the yoke 150. The button 160 is biased inwardly against the side of the frame by the spring 166 which is seated on the mounting pin 162 and held in position by the snap ring 168. The button 160 can readily be pulled outwardly by the operator and turned so as to insert the short pin 174 thereon selectively into either of the holes 176, 178 in the adjacent yoke arm 151 which are spaced respectively forwardly and rearwardly of the bearing hole 164. When in the forward hole 176, the pin 174 extends into a notch 158 milled into the rear edge of the hammer, as illustrated in FIGS. 16 and 19–21. When in the rearward hole 178, the pin 174 is disposed rearwardly of the hammer 120, as illustrated in FIGS. 14 and 17.

Extending from one edge of the button 160 and along the side of the frame 102 is a projection 184, which extends upwardly when the button is turned to place the pin 174 in the hole 178 and which is engageable in the safety notch 186 of the operating slide 106.

As shown in the drawings, one half of the safety button 160 is conveniently checkered and the other half polished and smooth so that the user can determine the operative setting of the button by feel in the dark.

Referring now to the functioning of the assembly, the top views in FIGS. 14 and 16 and the schematic views in FIGS. 17–21 illustrate the parts as disposed in the several operative positions.

In FIGS. 14 and 17 the button 160 is set for normal firing with pin 174 in the rearmost hole 178 of the yoke 150 wherein it is rearwardly of and does not interfere with the operation of the hammer or sear so that the pistol may be fired in the usual manner.

In FIG. 18 the button 160 has been moved upwardly to the "safe" position which causes the projection 184 to engage in the safety notch 186 on the slide 106, and at the same time pivots the yoke to engage the hook 154 thereon with the projection 156 of the sear, thus blocking movement both of the sear 114 and of the slide 106 and effecting a double-safety action. As the button 160 is moved into or out of the safety position, a nipple 182 on the inside of the button rides into or out of the depression 146 in the frame, making the clicking sound characteristic of safety actions.

In FIGS. 16 and 19 the button 160 has been placed in the dry-firing position by pulling outwardly thereon until the pin 174 has cleared the frame and then rotating it 180° to permit the pin 174 to enter the forward hole 176 of the yoke arm 151 and into the notch 158 of the hammer 120. As illustrated, the elongated notch 158 is of greater length than the diameter of the pin 174 so that some pivotal movement of the hammer 120 can take place before the pin 174 abuts the bottom portion of the notch 158. The nipple 182 rides freely in the ledge-like recess 148 adjacent the cut-out 144.

In FIG. 20, the trigger 108 has been pulled to disengage the sear 114 from the hammer 120 to release the hammer. As the hammer 120 falls forwardly, the lower end of the notch 158 engages the pin 174 and then the pivotal force of the hammer acting on the pin 174 pivots the yoke 150 until the pin 174 engages the shoulder 145 stopping further movement of the hammer. The shoulder 145 of frame 102 is adapted to seat in a milled notch 180 of the pin 174 to prevent outward movement of the pin and button while the hammer is in this dry-fired position, thus obviating accidental disengagement.

In FIG. 21, the operation for recocking the hammer after dry-firing is illustrated. The button 160 is merely pushed downwardly to pivot the yoke 150 and at the same time draw back the hammer 120 because of the engagement of the pin 174 with the end of the notch 158 in the hammer. As the hammer is pivoted rearwardly, the sear-engaging ledge 118 is moved to position so that when the button 160 is released, the hammer will be reset in cocked engagement with the sear 114, as illustrated in FIG. 19.

In both of the illustrated embodiments, the dry-firing device is provided by a member which is supported on the frame for movement into the path of movement of the hammer to limit the pivoting of the hammer when the sear is moved to hammer-releasing position. In both embodiments, this limitation of hammer movement is provided by engagement of a transversely extending pin on either the hammer or dry-firing member in a recess, provided by a slot and notch respectively, in the other element so as to limit relative movement therebetween and by limiting the movement on the frame of the dry-firing member.

It is readily apparent from the specification and drawings that the present invention provides a simple and economical safety assembly for dry-firing of automatic pistols without abuse to the firing pin. The assembly further provides for speedy and facile recocking of the hammer, and also ensures that the operating safety button will not be disengaged inadvertently from the released hammer without recocking. An additional feature is that of the positive sear safety device in conjunction with the slide latch and dry-firing mechanism, thus providing a double-safety action.

Because of the relative simplicity of operation and parts, the mechanism of the present invention may be readily applied to automatic pistols of the type having a well in which the hammer is pivotally mounted, and even to those already manufactured since the frame may be machined quite easily to accommodate the additional and/or substitute parts.

Although but two embodiments of the invention have been illustrated and described, it will be readily apparent to those skilled in the art that modifications and changes may be made without departing from the scope and spirit of the invention.

I claim:

1. In a firearm of the type having a frame, a pivoted hammer in the frame, a sear movable between a position for retaining the hammer in cocked position and a position releasing the hammer, and a trigger mechanism for moving the sear to releasing position, the combination therewith of a dry-firing device comprising a member supported by the frame and movable into the path of movement of the hammer for engagement with the hammer to limit movement of the hammer when the sear is moved to releasing position, and means on said dry-firing device for returning the hammer to its cocked position.

2. In a firearm of the type having a frame, a pivoted concealed hammer member in the frame, a sear movable between a position for retaining the hammer member in a cocked position and a position releasing the hammer member, and a trigger mechanism for moving the sear to releasing position, the combination therewith of a dry firing device including a member supported on the frame for limited movement relative to the hammer and frame and means for limiting movement of the hammer member when the sear is moved to releasing position including a projection on one of said members extending transversely of the frame and an aperture for receiving the projection in the other of said members adapted to limit relative movement therebetween, said dry firing member being movable into the path of said hammer member for registry of said hammer movement limiting means and into a non-interfering position for normal firing, and an exposed thumbpiece on said dry-firing member for returning the hammer to its cocked position.

3. In a firearm of the type having a frame, a pivoted hammer in the frame, a sear movable between a position for retaining the hammer in cocked position and a position releasing the hammer, and a trigger mechanism for moving the sear to releasing position, the combination therewith of a dry-firing device comprising a member supported by the frame and having means for projection into the path of movement of the hammer for engagement with the hammer to limit movement of the hammer when the sear is moved to releasing position, said member being mounted for limited movement in the direction of movement of the hammer for recocking the hammer.

4. In a firearm of the type having a frame, a hammer member pivotally mounted in the frame, a sear movable between a position for retaining the hammer member in cocked position and a position releasing the hammer, the combination therewith of a safety member supported on the frame for limited movement and having means for locking the sear in hammer retaining position in one position thereof, and means for limiting movement of the hammer member in a second position thereof when the sear is moved to releasing position, said hammer movement limiting means including a projection on one of said members extending transversely of the frame and an aperture for receiving a pin in the other of said members and adapted to limit relative movement therebetween, said safety member being movable into a third position wherein said sear locking means and hammer movement limiting means are non-interfering with the normal operation of said pistol, and means on said safety member for manually recocking said hammer when the safety member is in said second position.

5. In a firearm of the type having a frame, a pivoted hammer in the frame, a sear movable between a position for retaining the hammer in cocked position and a position releasing the hammer, and a trigger mechanism for moving the sear to releasing position, the combination therewith of a dry-firing device comprising a member movably supported by the frame and having a projection extending transversely of the frame, a notch in the hammer for receiving the projection, and means for positioning the member with the projection spaced from the hammer to permit normal firing or with the projection in the notch of the hammer to limit movement thereof when the sear is moved to releasing position, said member being manually movable to recock the hammer when the projection thereof is in the notch of the hammer.

6. In a firearm of the type having a frame, a concealed pivoted hammer in the frame, a sear movable between a position for retaining the hammer in cocked position and a position releasing the hammer, and a trigger mechanism for moving the sear to releasing position, the combination therewith of a dry-firing device comprising a projection on the hammer extending transversely of the frame and a member supported by the frame for limited movement relative thereto, said member having an aperture therein for receiving the projection on said hammer and adapted to limit relative movement therebetween in one position of said member, said member being movable into a second position permitting free movement of said projection relative thereto for normal firing of the pistol, said member having a thumbpiece exposed on one side of said frame and being operable to recock said hammer when positioned in said one position.

7. In a pistol of the type having a frame, a concealed pivoted hammer in the frame, a sear movable between a position for retaining the hammer in cocked position and a position releasing the hammer, and a trigger mechanism for moving the sear to releasing position, the combination therewith of a safety member movable into and out of position blocking releasing movement of the sear, a thumb piece mounted on the safety member and having a plurality of adjusted positions thereon, and means on the thumb piece engageable with the hammer in one of said adjusted positions to limit movement of the hammer when the sear is released, said thumb piece being movable in the direction opposite hammer movement when in said one adjusted position to recock the hammer.

8. In a firearm, a frame, a concealed hammer pivotally mounted in the frame and having a notch in one of its faces, a sear movable between a position for retaining the hammer in cocked position and a position releasing the hammer, a safety member movable into and out of position blocking releasing movement of the sear, a thumbpiece mounted on the safety member and having a plurality of adjusted positions thereon, and a pin on the thumbpiece engageable in the hammer notch when the thumbpiece is in one of said adjusted positions, said safety member being mounted for limited movement when said pin is engaged in said notch whereby said hammer may be recocked after dry firing.

9. In a firearm, a frame, a hammer pivotally mounted in the frame and having a notch in one of its faces, a sear movable between a position for retaining the hammer in cocked position and a position releasing the hammer, a sear block pivotally movable into and out of position preventing releasing movement of the sear, a thumbpiece on the sear block and having a plurality of rotatably adjustable positions thereon, a pin on the thumbpiece engageable in the hammer notch in one of said adjustable positions, and an opening in the frame accommodating the thumbpiece and dimensioned to limit movement of the thumbpiece with the sear block, said sear block being manually pivotable when said pin on said thumbpiece is engaged in said notch to recock the hammer.

10. In a firearm, a frame having a well, a hammer pivotally mounted in the well and having a notch on a rearwardly directed face thereof, a sear pivotally mounted in the well and engageable with the hammer in its cocked position, a yoke having a pair of arms on opposite sides of the hammer pivotally mounted coaxially with the hammer, a projection on one of said arms for engagement with the sear when the yoke is in an upwardly pivoted position to block release of the sear, a thumbpiece having a mounting pin received in transversely aligned apertures in the yoke and being axially retractable and rotatable relative to the yoke, a second pin extending from the thumbpiece and insertable selectively in a first aperture forwardly and a second aperture rearwardly of said aligned apertures, said second pin being receivable in the hammer notch when the second pin is in the first aperture and being rearwardly of the hammer when the second pin is in the second aperture, an opening in the side wall of the frame to accommodate the thumbpiece and dimensioned to limit movement thereof with the yoke.

11. In a firearm, a frame having a well, a hammer pivotally mounted in the well and having a notch on a rearwardly directed face thereof, a sear pivotally mounted in the well and engageable with the hammer in its cocked position, a yoke having a pair of arms on opposite sides of the hammer pivotally mounted coaxially with the hammer, a projection on one of said arms for engagement with the sear when the yoke is in an upwardly pivoted position to block release of the sear, a thumbpiece having a mounting pin received in transversely aligned apertures in the yoke and being axially retractable and rotatable relative to the yoke, a second pin extending from the thumbpiece and insertable selectively in a first aperture forwardly and a second aperture rearwardly of said aligned apertures, said second pin being receivable in the hammer notch when said second pin is in the first aperture and being rearwardly of said second hammer when the pin is in the second aperture, a spring biasing the thumbpiece toward the yoke, an opening in the side wall of the frame to accommodate the thumbpiece and dimensioned to limit movement thereof with the yoke, and a notch in the second pin engageable with the wall of the frame to prevent retraction of the thumbpiece when the pistol has been dry fired.

12. In a firearm, a frame, a concealed hammer pivotally mounted on the frame and having a pin in one side projecting transversely of the frame, a sear movable between a position for retaining the hammer in a cocked position and a position releasing the hammer, a safety member mounted on the frame for limited movement relative thereto, said safety member having means thereon for engagement with the sear to prevent hammer releasing movement in one position and having a hook-shaped recess therein for receiving the pin on said hammer with the hook portion thereof overlying the pin to limit relative movement therebetween in a second position of said member, said member being movable into a third position permitting free movement of the pin relative thereto for normal firing of the pistol, said safety member having an exposed thumbpiece for manually recocking the hammer after dry-firing.

13. In a firearm, a frame, a concealed hammer pivotally mounted on the frame and having a pin in one side projecting transversely of the frame, a sear pivotally mounted on the frame rearwardly of said hammer and engageable therewith for retaining said hammer in a cocked position, said sear being pivotable into a hammer releasing position, a dry firing and safety member mounted on said frame for limited movement relative thereto, said member having a portion extending longitudinally of said frame adjacent said hammer and sear with means on the rearward end thereof for locking said sear in engagement with said hammer in one position of said dry firing member, said portion having an aperture therein for receiving the pin on said hammer and adapted to limit relative movement therebetween in a second position of said member, said member being movable into a third position permitting free movement of the pin relative thereto for normal firing of the pistol and having a thumbpiece for effecting the several movements, said dry-firing and safety member being movable in the direction of hammer movement to recock the hammer after dry-firing.

14. In a firearm, a frame, a hammer pivotally mounted in the frame, a sear pivotally mounted in said frame rearwardly of said hammer and movable between a position for retaining the hammer in cocked position and a position releasing the hammer, a dry firing pin on said hammer extending transversely of said frame, a safety and dry firing member mounted on said frame for limited pivotable and rectilinear movement relative thereto, said member having a first portion in said frame extending longitudinally of said frame adjacent said hammer and sear and a second portion outwardly of the frame having a thumbpiece thereon for effecting movement, said first portion having means for locking said sear in engagement with said hammer in one position thereof and a recess for receiving said dry firing pin, said recess being adapted to limit relative movement between said hammer and dry firing member in a second position thereof, said dry firing member having limited freedom of movement relative to said frame in the direction of hammer movement to limit the amount of movement of said hammer in the said second position of said dry firing member, and said dry-firing member being manually movable, when in said second position, in the direction opposite the movement of the hammer during firing to recock the hammer.

15. In a pistol, a frame having a well and an opening in one side thereof; a hammer; a pin pivotally mounting said hammer in the well; a sear pivotally mounted in the well rearwardly of said hammer and engageable with the hammer in its cocked position, a safety and dry firing of arms on opposite surfaces of the side of the frame, said member having an elongated opening at its forward end through which said hammer pivot pin extends to provide a coaxial pivotal mounting with said hammer permitting relative longitudinal movement therebetween; said arm having a generally L-shaped aperture therein opening on the upper edge thereof and defining a hook; a projection on the rearward portion of the inner arm for engagement with the rear surface of the sear when the safety member is in a rearwardly and upwardly pivoted position to block release of the sear; a thumbpiece on the outer arm for effecting movement of said member into the several positions thereof; and a dry firing pin on said hammer extending transversely of the frame into said L-shaped aperture of the safety member, said dry firing pin being freely movable within the open forward portion of said L-shaped aperture of the inner arm in the rearwardly and downwardly pivoted position thereof for normal firing of the pistol; and said hook engaging said dry firing pin in the forward position of said member to limit relative movement therebetween and said member having limited freedom of movement relative to said frame in the direction of hammer pivoting to limit the amount of movement of said hammer.

16. In a pistol, a frame having a well and an opening in one side thereof; a hammer; a pin pivotally mounting said hammer in said well; a sear pivotally mounted in said well rearwardly of said hammer and engageable with the hammer in its cocked position; a safety and dry firing member in said frame opening and having a pair of upwardly disposed arms on opposite surfaces of the side of the frame, the inner arm extending longitudinally adjacent said hammer and sear, said inner arm having an elongated opening at its forward end through which said hammer pivot pin extends to provide a coaxial pivotal connection with said hammer and permit relative longitudinal movement therebetween and rearwardly thereof having a generally L-shaped aperture opening on the upper edge thereof and defining a hook rearwardly of the opening in the upper edge, said inner arm having a projection on its rearward end for engagement with the rearward surface of the sear to block release thereof when the safety member is in a rearwardly and upwardly pivoted position; a thumbpiece on the outer arm for effecting movement of said safety member; an operating slide slidably mounted on the upper portion of said frame and having a safety notch in which the outer arm of said safety member engages in said rearwardly and upwardly pivoted position thereof; a dry firing pin on said hammer extending transversely of the frame and into said L-shaped aperture of the safety member, said dry firing pin being freely movable within the open forward portion of the L-shaped aperture in the rearwardly and downwardly pivoted position of said safety member for normal firing of the pistol, said hook engaging said dry firing pin in the forward position of said safety member to limit relative movement therebetween with said outer arm butting against said slide to limit pivotal movement in the direction of hammer pivoting to limit the amount of movement of said hammer.

References Cited in the file of this patent

UNITED STATES PATENTS

| | | |
|---|---|---|
| 1,070,582 | Browning | Aug. 19, 1913 |
| 1,818,086 | Nickl | Aug. 11, 1931 |